(12) United States Patent
You et al.

(10) Patent No.: US 8,433,515 B2
(45) Date of Patent: Apr. 30, 2013

(54) METHOD FOR MEASURING PRECISION OF STAR SENSOR AND SYSTEM USING THE SAME

(75) Inventors: Zheng You, Beijing (CN); Fei Xing, Beijing (CN); Ting Sun, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 13/386,979

(22) PCT Filed: Aug. 3, 2011

(86) PCT No.: PCT/CN2011/077977
§ 371 (c)(1),
(2), (4) Date: Jan. 25, 2012

(87) PCT Pub. No.: WO2013/004033
PCT Pub. Date: Jan. 10, 2013

(65) Prior Publication Data
US 2013/0013199 A1    Jan. 10, 2013

(51) Int. Cl.
*G01C 21/02* (2006.01)
(52) U.S. Cl.
USPC ................................ 701/513; 701/300; 703/2
(58) Field of Classification Search .................. 701/300, 701/400, 408, 513; 703/2; 382/103; 250/252.1; 356/139.01, 152.1; 702/95
See application file for complete search history.

(56) References Cited

U.S. PATENT DOCUMENTS

| | | | | |
|---|---|---|---|---|
| 4,944,587 A | * | 7/1990 | Harigae | 356/139.01 |
| 5,107,434 A | * | 4/1992 | Paluszek | 701/13 |
| 5,177,686 A | * | 1/1993 | Boinghoff et al. | 701/513 |
| 5,412,574 A | * | 5/1995 | Bender et al. | 701/513 |
| 5,477,459 A | * | 12/1995 | Clegg et al. | 701/300 |
| 5,745,869 A | * | 4/1998 | van Bezooijen | 701/513 |
| 5,984,238 A | * | 11/1999 | Surauer et al. | 244/171 |
| 7,822,572 B2 | * | 10/2010 | Zhang et al. | 702/105 |
| 8,022,986 B2 | * | 9/2011 | Jekel | 348/139 |
| 8,218,013 B1 | * | 7/2012 | Ellis et al. | 348/169 |
| 2008/0199077 A1 | * | 8/2008 | Fowell | 382/190 |
| 2008/0258051 A1 | * | 10/2008 | Heredia et al. | 250/252.1 |
| 2011/0238307 A1 | * | 9/2011 | Psiaki et al. | 701/213 |
| 2012/0257792 A1 | * | 10/2012 | Simon | 382/103 |

* cited by examiner

*Primary Examiner* — Russell Frejd
(74) *Attorney, Agent, or Firm* — Houtteman Law LLC

(57) ABSTRACT

A method for measuring a precision of a star sensor and a system using the same may be provided. The method may comprise steps of: 1) fixing the star sensor on the Earth; 2) inputting a current time (T) of a measuring start time relative to a J2000.0 time; 3) determining a directional vector of the navigation star in a J2000.0 Cartesian coordinate system at the current time (T) according to a right ascension and a declination of the navigation star in the J2000.0 Cartesian coordinate system and visual movement parameters ($\alpha'$, $\delta'$) of the navigation star in the direction of the right ascension and the declination which are stored in the star sensor; 4) converting the directional vector of the navigation star in the J2000.0 Cartesian coordinate system into a directional vector of the navigation star in an ecliptic coordinate system; 5) converting the directional vector of the navigation star in the ecliptic coordinate system into a directional vector ($v_{CRFT}$) of the navigation star in a celestial coordinate system; and 6) converting the directional vector ($v_{CRFT}$) of the navigation star in the celestial coordinate system into a directional vector ($v_{TRF}$) of the navigation star in a terrestrial coordinate system, and obtaining the precision of the star sensor based on the directional vector ($v_{TRF}$) of the navigation star in the terrestrial coordinate system.

20 Claims, 6 Drawing Sheets

METHOD FOR MEASURING PRECISION OF STAR SENSOR AND SYSTEM USING THE SAME

FIELD

The present disclosure relates to the field of an attitude sensor, more particularly to a method for measuring a precision of a star sensor and a system using the same.

BACKGROUND

A star sensor has become one of the most competitive attitude sensors in current spacecrafts due to advantages such as high precision, low power consumption and small volume etc. Currently, the attitude determination precision of the star sensor has reached 10", and even some star sensors have the attitude determination accuracies up to 1". High precision is one of key factors of rapid development and wide application of the star sensors. As the precision of the star sensor becomes higher and higher, the requirement for an accurate measuring method becomes stricter and stricter. A conventional measuring method is mainly based on a star simulator and a precise rotary table, a position accuracy of the rotary table needs to be higher than a measuring precision of the star sensor by one order of magnitude, that is, reaches sub-arcsecond scales. This apparatus is expensive and complex to operate. Meanwhile, when a star sensor is calibrated by the rotary table in a laboratory, the star simulator is used as a measuring reference, however, it is very difficult to provide a whole celestial star simulator meeting requirements for a spectral range, a magnitude and the position accuracy. There is a big gap between the star simulator and navigation stars in a real Night sky. The conventional star simulator may not fully simulate circumstances of the real Night sky, so that the validity and the accuracy of the laboratory testing may not be convincing.

Therefore, there is an urgent need for a method for measuring the precision of the star sensor and a system using the same, which may be easy to achieve and meet the requirement for the accuracy.

SUMMARY

The present disclosure is directed to solve at least one of the problems existing in the prior art. Accordingly, a method for measuring a precision of a star sensor may need to be provided, which may be easy to achieve, and solve problems of complex operation, expensive precise rotary table and expensive star simulator in the conventional method for measuring the precision of the star sensor, with the measuring results being more accurate and more real compared with the conventional method in the art and with the precision of the star sensor meeting the requirement of the star sensor.

Further, a system for measuring a precision of a star sensor may also need to be provided, which may be simple to achieve and meet the precision measuring requirement of the star sensor.

According to a first aspect of the present disclosure, a method for measuring a precision of a star sensor may be provided. The method may comprise steps of: 1) fixing the star sensor on the Earth so as to point a main axis of the star sensor towards the zenith, the star sensor being inputtable with time parameters which is stored with a navigation star catalog and visual movement parameters associated with a navigation star in the navigation star catalog; 2) inputting a current time (T) of a measuring start time relative to a J2000.0 time; 3) determining a directional vector of the navigation star in a J2000.0 Cartesian coordinate system at the current time (T) according to a right ascension and a declination ($\alpha$, $\delta$) of the navigation star in the J2000.0 Cartesian coordinate system and visual movement parameters ($\alpha'$, $\delta'$) of the navigation star in the direction of the right ascension and the declination which are stored in the star sensor; 4) converting the directional vector of the navigation star in the J2000.0 Cartesian coordinate system at the current time (T) into a directional vector of the navigation star in an ecliptic coordinate system; 5) converting the directional vector of the navigation star in the ecliptic coordinate system into a directional vector ($v_{CRFT}$) of the navigation star in a celestial coordinate system at the current time (T); and 6) converting the directional vector ($v_{CRFT}$) of the navigation star in the celestial coordinate system at the current time (T) into a directional vector ($v_{TRF}$) of the navigation star in a terrestrial coordinate system at an actual shooting time (T+$\Delta$t) according to the actual shooting time (T+$\Delta$t), and obtaining the precision of the star sensor based on the directional vector ($v_{TRF}$) of the navigation star in the terrestrial coordinate system.

With the method for measuring the precision of the star sensor according to an embodiment of the present disclosure, by using the precise accuracy of the Earth rotation, the star sensor is fixed on the Earth to point the main axis of the star sensor towards the zenith and moves ($\Omega$=7.292115×10$^{-5}$ rad/s) along with the Earth, and the angle variation of measured values of the star sensor corresponds to the movement of the star sensor. However, navigation stars stored in the navigation star catalog is expressed by coordinates in the J2000.0 Cartesian coordinate system (CRFJ2000), and due to the inconsistency of accuracies of three axes of the star sensor, a pointing precision of the star sensor is higher than a rolling precision thereof by one order of magnitude. In order to ensure the integrity of the pointing precision and high accuracy of the measurement, coordinates of the navigation stars in the star sensor are converted into coordinates of the navigation star in the terrestrial coordinate system (TRF) at the current measuring time, thus eliminating the influence of a roll axis of the Earth on the pointing precision. At this time, theoretically, outputting result of the star sensor is a constant value, i.e., a mounting matrix of the star sensor coordinate system relative to the terrestrial coordinate system. The change in the main axis of the star sensor in the terrestrial coordinate system may be measured based on the mounting matrix, thus measuring the precision of a pointing axis of the star sensor.

According to an embodiment of the present disclosure, in the step 3), the directional vector ($v_{CRFJ2000}$) of the navigation star in the J2000.0 Cartesian coordinate system at the current time (T) is as follows:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

According to an embodiment of the present disclosure, in the step 4), the directional vector ($v_{ERF}$) of the navigation star in the ecliptic coordinate system is acquired by rotating the J2000.0 Cartesian coordinate system around an X axis of the J2000.0 Cartesian coordinate system counterclockwise through 23° 26'21" based on the directional vector ($v_{CRFJ2000}$) of the navigation star in the J2000.0 Cartesian coordinate system:

$$v_{ERF} = R_x(23°26'21")v_{CRFJ2000}.$$

According to an embodiment of the present disclosure, converting the directional vector ($v_{ERF}$) of the navigation star in the ecliptic coordinate system into the directional vector ($v_{CRFT}$) of the navigation star in the celestial coordinate system at the current time (T) is obtained by:

rotating the directional vector ($v_{ERF}$) of the navigation star in the ecliptic coordinate system around a Z axis thereof clockwise through 50.29"×T;

rotating the obtained vector of the navigation star around an X axis of a coordinate system after the first rotating clockwise through 23°26'21";

rotating the obtained vector of the navigation star around an X axis of a coordinate system after the second rotating counterclockwise through $\epsilon_A$;

rotating the obtained vector of the navigation star around a Z axis of a coordinate system after the third rotating clockwise through $\Delta\phi$; and rotating the obtained vector of the navigation star around an X axis of a coordinate system after the fourth rotating clockwise through $\epsilon_A+\Delta\epsilon$, to obtain the directional vector ($v_{CRFT}$) of the navigation star in the celestial coordinate system at the current time (T) containing nutation terms, in which the $\Delta\phi$ and $\Delta\epsilon$ represent a nutation in longitude and an oblique nutation respectively.

According to an embodiment of the present disclosure, the directional vector ($v_{CRFT}$) of the navigation star in the celestial coordinate system is acquired by following formulas:

$$v_{CRFT}=R_x(-(\epsilon_A+\Delta\epsilon))R_Z(-\Delta\phi)R_X(\epsilon_A)$$

$$R_x(-23°26'21")R_Z(-50.29"\times T)R_X(23°26'21")$$
$$v_{CRFJ2000},$$

where $R_x$ and $R_z$ are coordination transformation bases.

According to an embodiment of the present disclosure, according to the IAU2000B nutation model, $\epsilon_A$, the nutation in longitude ($\Delta\phi$) and the oblique nutation ($\Delta\epsilon$) are obtained by following formulas respectively:

$$\varepsilon_A = \varepsilon_0 - 46.84024"t - 0.00059"t^2 + 0.001813"t^3$$

$$\Delta\varphi = \Delta\varphi_P + \sum_{i=1}^{77}[(A_{i1}+A_{i2}t)\sin\alpha_i + A_{i3}\cos\alpha_i]$$

$$\Delta\varepsilon = \Delta\varepsilon_P + \sum_{i=1}^{77}[(A_{i4}+A_{i5}t)\sin\alpha_i + A_{i6}\cos\alpha_i]$$

where $\Delta\phi_P=-0.135$ m("), $\Delta\epsilon_P=0.388$ m("), $\epsilon_0=84381.448"$, t is a Julian century number starting from J2000.0 and is obtained based on the current time (T); and an argument $\alpha_i$ is a linear combination of arguments which is determined as follows:

$$\alpha_i = \sum_{k=1}^{5} n_{ik} F_k$$
$$= n_{i1}l + n_{i2}l' + n_{i3}F + n_{i4}D + n_{i5}\Omega$$

where $n_{ik}$ is an integer, and $F_k$ is a Delaunay argument related to positions of the Sun and the Moon.

According to an embodiment of the present disclosure, the step 6) further comprises:

(61) converting the directional vector ($v_{CRFT}$) of the navigation star in the celestial coordinate system at the current time (T) into the directional vector ($v_{TRF}$) of the navigation star in the terrestrial coordinate system at the actual shooting time (T+$\Delta$t) according to the actual shooting time (T+$\Delta$t);

(62) solving an optimal attitude matrix ($A_q$(T+$\Delta$t)) of the star sensor by the QUEST method according to the directional vector ($v_{TRF}$) of the navigation star in the terrestrial coordinate system;

(63) calculating a pointing vector (p(T+$\Delta$t)) of the main axis of the star sensor at the actual shooting time (T+$\Delta$t); and

(64) calculating an angle ($\alpha_{ij}$) of the pointing vectors (p(T+$\Delta$t)) of the main axis of the star sensor at the actual shooting time (T+$\Delta$t) to obtain a pointing precision of the star sensor.

According to an embodiment of the present disclosure, the directional vector ($v_T$) of the navigation star in the terrestrial coordinate system is obtained by rotating the directional vector ($v_{CRFT}$) of the navigation star in the celestial coordinate system around a Z axis of the celestial coordinate system counterclockwise at an angular velocity $\Omega$ of $7.292115\times10^{-5}$ rad/s $$v_{TRF}=R_Z(\Omega\Delta t)R_X(-(\epsilon_A+\Delta\epsilon))R_Z-\Delta\phi)R_X(\epsilon_A)$$

$$R_x(-23°26'21")R_Z(-50.29"\times T)R_X(23°26'21")$$
$$v_{CRFJ2000}.$$

According to an embodiment of the present disclosure, the optimal attitude matrix ($A_q$(T+$\Delta$t)) is obtained by minimizing a following objective function J($A_q$(T+$\Delta$t)):

$$J(A_q(T+\Delta t)) = \frac{1}{2}\sum_{i=1}^{n}\alpha_i\|w_i - A_q(T+\Delta t)v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma\alpha_i=1$.

According to an embodiment of the present disclosure, the pointing vector (p(T+$\Delta$t)) of the main axis of the star sensor is as follows:

$$p(T+\Delta t) = A_q(T+\Delta t)\begin{bmatrix}0\\0\\1\end{bmatrix}.$$

According to an embodiment of the present disclosure, the angle ($\alpha_{ij}$) of the pointing vectors (p(T+$\Delta$t)) of the main axis of the star sensor is as follows:

$$\alpha_{ij}=a\cos(p(T+\Delta t_i)^T \cdot p(T+\Delta t_j)),$$

where i≠j.

According to a second aspect of the present disclosure, a system for measuring a precision of a star sensor may be provided. The star sensor comprises a navigation star catalogue comprising a navigation star and visual movement parameters associated with the navigation star, and a time input interface for inputting a measuring start time. The system comprises: a fixing device for fixing the star sensor on the Earth so as to point a main axis of the star sensor towards the zenith; and a star sensor precision measurement unit for measuring the precision of the star sensor, in which a current time (T) of the measuring start time relative to a J2000.0 time is input through the time input interface, a directional vector of the navigation star in a J2000.0 Cartesian coordinate system at the current time (T) is determined according to a right ascension and a declination ($\alpha$, $\delta$) of the navigation star in the J2000.0 Cartesian coordinate system and visual movement parameters ($\alpha'$, $\delta'$) of the navigation star in the direction of the right ascension and the declination which are stored in the star sensor, the directional vector of the navigation star in the J2000.0 Cartesian coordinate system at the current time (T) is converted into a directional vector of the navigation star in an ecliptic coordinate system, the directional vector of the navigation star in the ecliptic coordinate system is converted into a directional vector ($v_{CRFT}$) of the navigation star in a celestial coordinate system at the current time (T), the directional vector ($v_{CRFT}$) of the navigation star in the celestial coordinate system at the current time (T) is converted into a directional vector ($v_{TRF}$) of the navigation star in a terrestrial coordinate system at an actual shooting time (T+$\Delta$t) according to the actual shooting time (T+$\Delta$t), and the precision of the star sensor is obtained based on the directional vector ($v_{TRF}$) of the navigation star in the terrestrial coordinate system.

With the system for measuring the precision of the star sensor according to an embodiment of the present disclosure, by using the precise accuracy of the Earth rotation, the star sensor is fixed on the Earth so as to point the main axis of the star sensor towards the zenith and moves ($\Omega = 7.292115 \times 10^{-5}$ rad/s) along with the Earth, and the angle variation of measured values of the star sensor corresponds to the movement of the star sensor. However, navigation stars stored in the navigation star catalog is expressed by coordinates in the J2000.0 Cartesian coordinate system (CRFJ2000), and due to the inconsistency of accuracies of three axes of the star sensor, a pointing precision of the star sensor is higher than a rolling precision thereof by one order of magnitude. In order to ensure the integrity of the pointing precision and high accuracy of the measurement, coordinates of the navigation stars in the star sensor are converted into coordinates of the navigation star in the terrestrial coordinate system (TRF) at the current measuring time, thus eliminating the influence of a roll axis of the Earth on the pointing precision. At this time, theoretically, outputting result of the star sensor is a constant value, i.e., a mounting matrix of the star sensor coordinate system relative to the terrestrial coordinate system. The change in the main axis of the star sensor in the terrestrial coordinate system may be measured based on the mounting matrix, thus measuring the precision of a pointing axis of the star sensor.

According to an embodiment of the present disclosure, the star sensor precision measurement unit further comprises: a Cartesian coordinate directional vector acquiring module for acquiring the directional vector ($v_{CRFJ2000}$) of the navigation star in the J2000.0 Cartesian coordinate system at the current time (T) by the following formula:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

According to an embodiment of the present disclosure, the star sensor precision measurement unit further comprises: an ecliptic coordinate system directional vector acquiring module for acquiring the directional vector ($v_{ERF}$) of the navigation star in the ecliptic coordinate system by rotating the J2000.0 Cartesian coordinate system around an X axis of the J2000.0 Cartesian coordinate system counterclockwise through 23°26'21" based on the directional vector ($v_{CRFJ2000}$) of the navigation star in the J2000.0 Cartesian coordinate system:

$$v_{ERF} = R_x(23°26'21")v_{CRFJ2000}.$$

According to an embodiment of the present disclosure, the star sensor precision measurement unit further comprises:
a celestial coordinate system directional vector acquiring module for converting the directional vector ($v_{ERF}$) of the navigation star in the ecliptic coordinate system into the directional vector ($v_{CRFT}$) of the navigation star in the celestial coordinate system at the current time (T) by:

rotating the directional vector ($v_{ERF}$) of the navigation star in the ecliptic coordinate system around a Z axis thereof clockwise through 50.29"×T;

rotating the obtained vector of the navigation star around an X axis of a coordinate system after the first rotating clockwise through 23°26'21";

rotating the obtained vector of the navigation star around an X axis of a coordinate system after the second rotating counterclockwise through $\epsilon_A$;

rotating the obtained vector of the navigation star around a Z axis of a coordinate system after the third rotating clockwise through $\Delta\phi$; and rotating the obtained vector of the navigation star around an X axis of a coordinate system after the fourth rotating clockwise through $\epsilon_A + \Delta\epsilon$, to obtain the directional vector ($v_{CRFT}$) of the navigation star in the celestial coordinate system at the current time (T) containing nutation terms, in which the $\Delta\phi$ and $\Delta\epsilon$ represent a nutation in longitude and an oblique nutation respectively.

According to an embodiment of the present disclosure, the celestial coordinate system directional vector acquiring module is configured to acquire the directional vector ($v_{CRFT}$) of the navigation star in the celestial coordinate system by following formulas:

$$v_{CRFT} = R_x(-\epsilon_A + \Delta\epsilon)R_Z(-\Delta\phi)R_X(\epsilon_A)$$

$$R_x(-23°26'21")R_Z(-50.29"\times T)R_X(23°26'21")$$
$$v_{CRFJ2000},$$

where $R_x$ and $R_z$ are coordination transformation bases.

According to an embodiment of the present disclosure, according to the IAU2000B nutation model, $\epsilon_A$, the nutation in longitude ($\Delta\phi$) and the oblique nutation ($\Delta\epsilon$) are respectively as follows:

$$\varepsilon_A = \varepsilon_0 - 46.84024"t - 0.00059"t^2 + 0.001813"t^3$$

$$\Delta\varphi = \Delta\varphi_P + \sum_{i=1}^{77}[(A_{i1} + A_{i2}t)\sin\alpha_i + A_{i3}\cos\alpha_i]$$

$$\Delta\varepsilon = \Delta\varepsilon_P + \sum_{i=1}^{77}[(A_{i4} + A_{i5}t)\sin\alpha_i + A_{i6}\cos\alpha_i]$$

where $\Delta\phi_P = -0.135$ m("), $\Delta\epsilon_P = 0.388$ m("), $\epsilon_0 = 84381.448"$, t is a Julian century number starting from J2000.0 and is obtained based on the current time (T); and an argument $\alpha_i$ is a linear combination of arguments which is determined as follows:

$$\alpha_i = \sum_{k=1}^{5} n_{ik} F_k$$

$$= n_{i1}l + n_{i2}l' + n_{i3}F + n_{i4}D + n_{i5}\Omega$$

where $n_{ik}$ is an integer, and $F_k$ is a Delaunay argument related to positions of the Sun and the Moon.

According to an embodiment of the present disclosure, the star sensor precision measurement unit is configured to: convert the directional vector ($v_{CRFT}$) of the navigation star in the celestial coordinate system at the current time (T) into the directional vector ($v_{TRF}$) of the navigation star in the terrestrial coordinate system at the actual shooting time (T+Δt) according to the actual shooting time (T+Δt); solve an optimal attitude matrix ($A_q$(T+Δt)) of the star sensor by the QUEST method according to the directional vector ($v_{TRF}$) of the navigation star in the terrestrial coordinate system; calculate a pointing vector (p(T+Δt)) of the main axis of the star sensor at the actual shooting time (T+Δt); and calculate an angle ($\alpha_{ij}$) of the pointing vectors (p(T+Δt)) of the main axis of the star sensor at the actual shooting time (T+Δt) to obtain a pointing precision of the star sensor.

According to an embodiment of the present disclosure, the star sensor precision measurement unit further comprises:

a terrestrial coordinate system directional vector acquiring module for acquiring the directional vector ($v_T$) of the navigation star in the terrestrial coordinate system by rotating the directional vector ($v_{CRFT}$) of the navigation star in the celestial coordinate system around a Z axis of the celestial coordinate system counterclockwise at an angular velocity Ω of 7.292115×10$^{-5}$ rad/s:

$v_{TRF} = R_Z(\Omega \Delta t) R_X(-(\epsilon_A + \Delta \epsilon)) R_Z(-\Delta \phi) R_X(\epsilon_A)$ $R_x(-23°26'21'') R_Z(-50.29'' \times T) R_X(23°26'21'')$ $v_{CRFJ2000}$.

According to an embodiment of the present disclosure, the optimal attitude matrix ($A_q$(T+Δt)) is obtained by minimizing a following objective function J($A_q$(T+Δt)):

$$J(A_q(T + \Delta t)) = \frac{1}{2} \sum_{i=1}^{n} \alpha_i \|w_i - A_q(T + \Delta t) v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma \alpha_i = 1$ According to an embodiment of the present disclosure, the pointing vector (p(T+Δt)) of the main axis of the star sensor is as follows:

$$p(T + \Delta t) = A_q(T + \Delta t) \begin{bmatrix} 0 \\ 0 \\ 1 \end{bmatrix}.$$

According to an embodiment of the present disclosure, the angle ($\alpha_{ij}$) of the pointing vectors (p(T+Δt)) of the main axis of the star sensor is as follows:

$\alpha_{ij} = a \cos(p(T+\Delta t_i)^T \cdot p(T+\Delta t_j))$, where i≠j.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
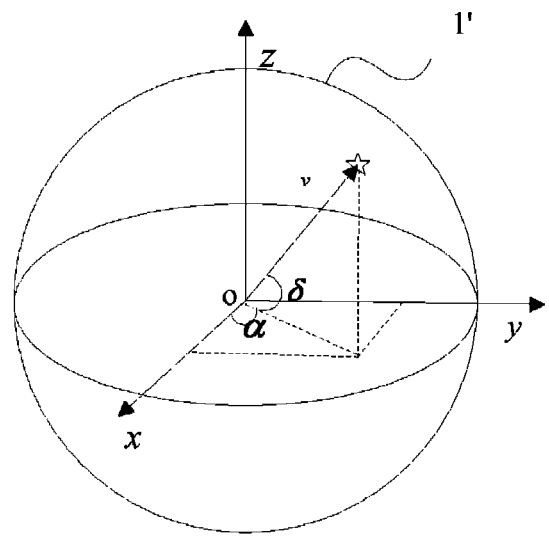
FIG. 1 is a schematic view of coordinate vectors of a fixed star in a spherical coordinate system and a Cartesian coordinate system.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the description, relative terms such as "longitudinal", "lateral", "front", "rear", "right", "left", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Therefore, a "first" or "second" feature may explicitly or implicitly comprise one or more features. Further, in the description, unless indicated otherwise, "a plurality of" refers to two or more.

In order to describe a method for measuring a precision of a star sensor and a system using the same according to an embodiment of the present disclosure, the working principle of a star sensor according to an embodiment of the present disclosure will be described beforehand hereinafter.

Measuring Principle of Star Sensor

An attitude of the star sensor usually refers to an orientation of the star sensor relative to a specific coordinate system, commonly, a celestial inertial coordinate system. The star sensor may determine an attitude of a spacecraft comprising the star sensor relative to the inertial space by measuring an orientation of a navigation star in a spacecraft coordinate system. In a working state, a vector of the navigation star in a star sensor coordinate system is firstly measured, and then identification is performed by an acquired star map to obtain a corresponding vector of the navigation star in the inertial coordinate system. A transformation matrix from the inertial coordinate system to the spacecraft coordinate system, i.e., the attitude of the spacecraft in the inertial coordinate system, may be obtained by comparing the corresponding vector relationships of the navigation star in the inertial coordinate system and the star sensor coordinate system.

A fixed star is used as a reference when the star sensor works. By numerous astronomical observations for many years, each fixed star is located in a relatively fixed position in a celestial sphere 1'. FIG. 1 is a schematic view of coordinate vectors of a fixed star in a spherical coordinate system and a Cartesian coordinate system of a celestial sphere. As shown in FIG. 1, as expressed by a right ascension and a declination of a spherical coordinate of the celestial sphere, the coordinate of the fixed star in the spherical coordinate system may be recorded as $(\alpha, \delta)$. According to the relationship between the Cartesian coordinate system and the spherical coordinate system of the celestial sphere, a directional vector of each fixed star in the Cartesian coordinate system of the celestial sphere may be obtained as follows:

$$v = \begin{bmatrix} \cos\alpha\cos\delta \\ \sin\alpha\cos\delta \\ \sin\delta \end{bmatrix}.$$

Navigation stars may be fixed stars meeting the imaging condition of the star sensor and selected from a star catalog to form a navigation star catalog. According to an embodiment of the present disclosure, the navigation star catalog may be stored in the star sensor, for example, a memory in the star sensor, at one time during the manufacturing process.

Figure 2:
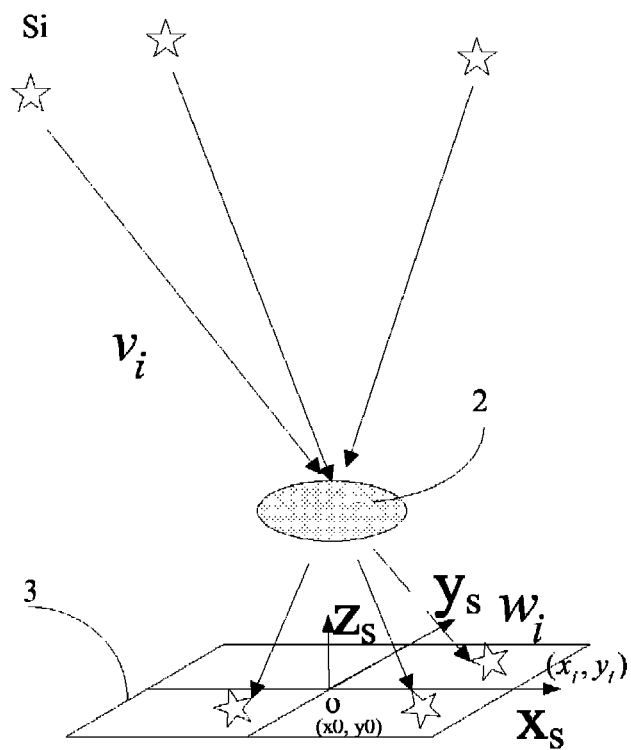
FIG. 2 is a schematic view showing star sensor imaging according to an embodiment of the present disclosure.

When an attitude matrix of the star sensor 1 in the celestial coordinate system is A, using the pinhole imaging principle of the star sensor 1, a directional vector $w_i$ of the navigation star $s_i$ in the star sensor coordinate system corresponding to a directional vector $v_i$ of the navigation star 5, in the celestial coordinate system may be measured through a lens 2 of the star sensor 1, as shown in FIG. 2.

As shown in FIG. 2, if a position of a main axis center of the star sensor 1 in a detector 3 is $(x_0, y_0)$, a position coordinate of the navigation stars $s_i$ in the detector 3 of the star sensor 1 is $(x_i, y_i)$ and a focal length of the star sensor 1 is f, then the directional vector $w_i$ of the navigation star $s_i$ in the star sensor coordinate system is as follows:

$$w_i = \frac{1}{\sqrt{(x_i - x_0)^2 + (y_i - y_0)^2 + f^2}} \begin{bmatrix} -(x_i - x_0) \\ -(y_i - y_0) \\ f \end{bmatrix}.$$

In an ideal condition, the following formula is satisfied:

$$w_i = Av_i$$

where A is an attitude matrix of the star sensor.

When two or more stars are observed, the attitude matrix A of the star sensor may be directly solved by, for example, the QUEST method, that is, an optimal attitude matrix $A_q$ may be solved by minimizing a following objective function $J(A_q)$:

$$J(A_q) = \frac{1}{2}\sum_{i=1}^{n} \alpha_i \|w_i - A_q v_i\|^2$$

where $\alpha_i$ represents a weighing coefficient, and $\Sigma\alpha_i=1$.

In this way, the optimal attitude matrix $A_q$ of the star sensor in the inertial space may be obtained.

Therefore, navigation stars with high precision may be needed in a real star sensor measuring system. Meanwhile, to ensure the covering capability of the view field of the star sensor, a system may need to be rotated so that the navigation stars may appear in different positions of the view field. For this reason, imaging of stars in different view fields may be achieved by a single star simulator and a rotary table with high accuracy in conventional calibrating and testing methods, thus achieving the calibrating and the testing of the system. To cover the whole system more actually and entirely, according to an embodiment of the present disclosure, the inventors of the present disclosure adopts a mode combining the real Night sky, such as a navigation star catalog, and Earth rotation, so that the measurement of the precision of the star sensor may be more real and accurate.

The Earth movement will be described in detail below, so that the Earth movement may be combined with the navigation star catalog to measure the precision of the star sensor with high accuracy and low cost.

Principle of Earth Movement

Figure 3:
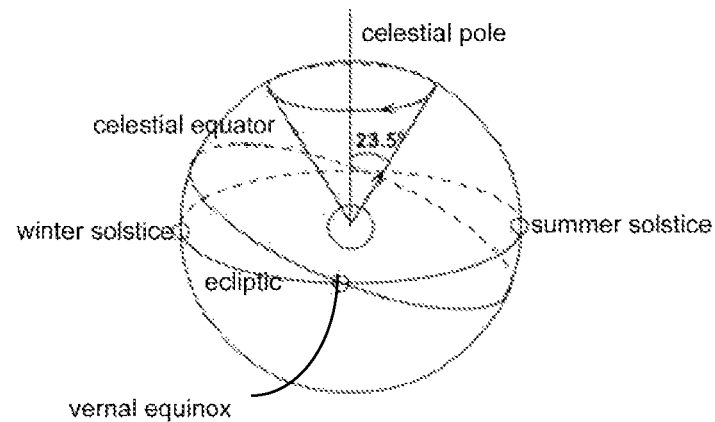
FIG. 3 is a schematic view of main coordinate system parameters of the Earth moving in a celestial system.

Because the precise movement of the Earth is used as a reference for the precise measurement of the star sensor in the method according to an embodiment of the present disclosure, the movement of the Earth in the inertial space needs to be analyzed and calculated in a strict manner. FIG. 3 is a schematic view of main coordinate system parameters of the Earth movement in a celestial coordinate system.

As shown in FIG. 3, an imaginary large sphere having any radius and using the Earth as a center thereof is referred to as the "celestial sphere", a circle on which the equatorial plane of the Earth intersects with the celestial sphere is referred to as a "celestial equator", and a circle on which the orbital plane of the Earth around the Sun intersects with the celestial sphere is referred to as an "ecliptic". The celestial equator intersects with the ecliptic at two points. An intersection point at which the ecliptic intersects with the celestial equator when the Sun moves from the south of the celestial equator to the north of the celestial equator is referred to as a vernal equinox. An intersection point at which the ecliptic intersects with the celestial equator when the Sun moves from the north of the celestial equator to the south of the celestial equator is referred to as an autumnal equinox. A period of time during which the Sun moves from the vernal equinox once and returns to the vernal equinox is referred to as one "tropical year".

If the direction of the Earth axis is not changed and the vernal equinox and the autumnal equinox do not move, the tropical year may be equal to a sidereal year. However, the Earth axis precesses around an ecliptic pole in a period slowly, and an intersection line of the equatorial plane and an ecliptic plane may also rotate in the ecliptic plane in the same period. As shown in FIG. 3, a celestial north pole revolves around an ecliptic north pole clockwise with a radius of 23°26'21". Because a revolution direction of the Earth is opposite to a precession direction of the Earth axis, a small west movement of the vernal equinox may be generated every year, which is referred to as an equation of equinoxes. It has been indicated by modern astronomical measurement and calculation results that the equation of equinoxes of the Earth every year is 50.29". In this way, the celestial north pole revolves around the ecliptic north pole once every about 25765 years.

Similar to a gyro movement model, the nutation of a rotation axis of the Earth may be performed besides the precession of the rotation axis of the Earth. The nutation of the rotation axis of the Earth may be generated for complicated reasons, and generally may be caused by the gravitation of other planets and the Moon near the Earth to the Earth. It has been shown by modern astronomical measuring results that, a period of the nutation is 18.6 years (6798 days), a nutation component in longitude on the ecliptic is 17.24", and an oblique nutation component perpendicular to the ecliptic is 9.21". Therefore, coordinates such as the right ascension and the declination may change.

Polar motion and so on of the rotation axis of the Earth may also be existing, however, the periodical change of the polar motion is below 0.1", which may be ignored relative to the accuracy or precision testing for the star sensor.

The movement of the Earth in the inertial space includes rotation of the Earth around the Earth axis, and also includes precession of the Earth axis around the ecliptic north pole as well as nutation and polar motion of the Earth axis. However, revolution of the Earth around the Sun may not result in the change of the Earth axis in the inertial space, and consequently may not influence the testing for the star sensor.

Establishing of Coordinate Systems

The celestial coordinate system, the ecliptic coordinate system, a terrestrial coordinate system and the star sensor coordinate system used in the method for measuring the precision of the star sensor according to an embodiment of the present disclosure will be described in detail below.

Figure 4:
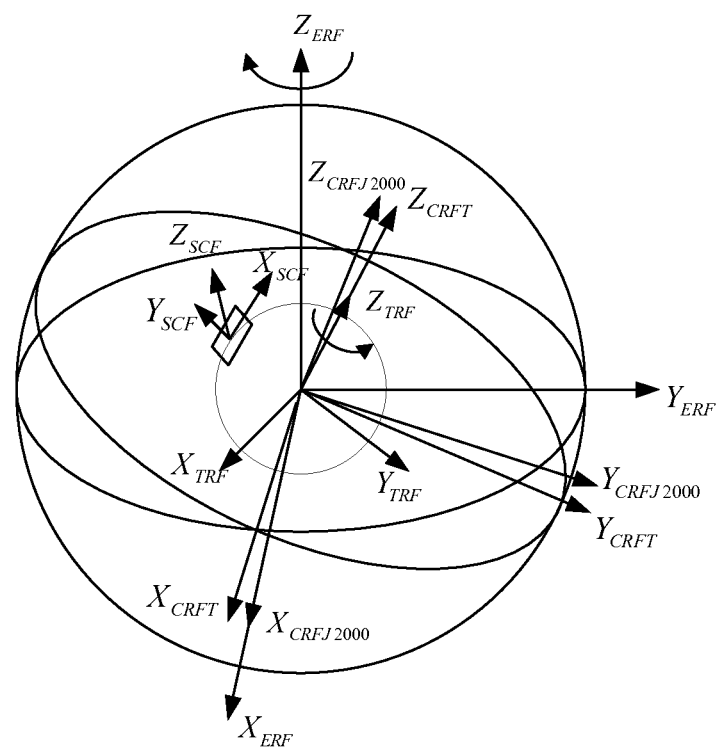
FIG. 4 is a schematic view of a celestial coordinate system, an ecliptic coordinate system, a terrestrial coordinate system and a star sensor coordinate system in a method for measuring a precision of a star sensor according to an embodiment of the present disclosure.

1) Celestial coordinate system: the celestial coordinate system is expressed by CRF. In consideration of the influence of equation of equinoxes and nutation, the celestial coordinate system is time-related. For the system analyzing convenience, a J2000.0 celestial coordinate system is established internationally, expressed by CRFJ2000, as shown in FIG. 4, a J2000.0 Cartesian coordinate system for short. The J2000.0 Cartesian coordinate system is established at 12 terrestrial dynamical time on Jan. 1, 2000, Anno Domini, with a Z axis pointing towards the north pole of the Earth, an X axis pointing towards the vernal equinox at the establishing time, and a Y axis. The Y axis, the X axis and the Z axis of the J2000.0 celestial coordinate system satisfy the right-hand rule. Information related to navigation stars in the star sensor is established based on the J2000.0 Cartesian coordinate system. Positions of navigation stars in the star sensor are all expressed in the J2000.0 Cartesian coordinate system. Due to the influence of equation of equinoxes, nutation and so on, the celestial coordinate systems at different time may rotate accordingly. The celestial coordinate system, expressed by CRFT, at certain time may be acquired by eliminating the influence of equation of equinoxes and nutation based on the J2000.0 Cartesian coordinate system.

2) Ecliptic coordinate system: the ecliptic coordinate system is expressed by ERF, for example, XERF, YERF and ZERF as shown in FIG. 4. The ecliptic coordinate system is established at 12 terrestrial dynamical time on Jan. 1, 2000, Anno Domini, and remains constant. A revolution orbit of the Earth around the Sun is referred to as the ecliptic, and with the core of the Earth as a center, an X axis pointing towards the vernal equinox at the establishing time and a Z axis perpendicular to the ecliptic plane. A Y axis, the X axis and the Z axis of the ecliptic coordinate system satisfy the right-hand rule. The X axis of the J2000.0 Cartesian coordinate system may coincide with the X axis of the ecliptic coordinate system. An angle between the Z axis of the ecliptic coordinate system and the Z axis of the J2000.0 Cartesian coordinate system is 23°26'21". The ecliptic coordinate system rotates around the Z axis of the J2000.0 Cartesian coordinate system by 50.29", which is referred to as the equation of equinoxes, every year.

3) Terrestrial coordinate system: the definition of the terrestrial coordinate system is similar to that of the celestial coordinate system, except that with the Earth movement, the terrestrial coordinate system rotates around the Z axis of the Earth (i.e., the Z axis of the celestial coordinate system) substantially uniformly at an angular velocity II of $7.292115 \times 10^{-5}$ rad/s. The terrestrial coordinate system is expressed by TRF as shown in FIG. 4.

4) Star sensor coordinate system: the star sensor coordinate system is fixed with the star sensor and moves along therewith, with a center of the detector of the star sensor as a center of the star sensor coordinate system. An X axis and a Y axis of the star sensor coordinate system are parallel to a row and a column of the detector respectively, and a Z axis, the X axis and the Y axis of the star sensor coordinate system may satisfy the right-hand rule. The star sensor coordinate system is expressed by SCF, for example, XSCF, YSCF and ZSCF as shown in FIG. 4. In use, the star sensor is fixed on the Earth and moves along with the terrestrial coordinate system.

Because the navigation stars measured by the star sensor are all fixed stars and are far from each other, origins of the abovementioned four coordinate systems may be considered to be the same point, and the transformation between the four coordinate systems may include only rotation transformation. The basic method of the rotation transformation is as follows.

If x, y, z are coordinates in an original coordinate system, and (x', y', z') are coordinates after the original coordinate system rotates, then $$\begin{bmatrix} x' \\ y' \\ z' \end{bmatrix} = R(\theta) \begin{bmatrix} x \\ y \\ z \end{bmatrix},$$

where coordinate transformation bases when the original coordinate system rotates around an X axis, a Y axis and a Z axis thereof respectively are as follows:

$$R_X(\theta) = \begin{bmatrix} 1 & 0 & 0 \\ 0 & \cos\theta & \sin\theta \\ 0 & -\sin\theta & \cos\theta \end{bmatrix},$$

$$R_Y(\theta) = \begin{bmatrix} \cos\theta & 0 & -\sin\theta \\ 0 & 1 & 0 \\ \sin\theta & 0 & \cos\theta \end{bmatrix},$$

$$R_Z(\theta) = \begin{bmatrix} \cos\theta & \sin\theta & 0 \\ -\sin\theta & \cos\theta & 0 \\ 0 & 0 & 1 \end{bmatrix}.$$

It has been found by the inventors through long-time research that by using the precise accuracy of the Earth rotation, the star sensor is fixed on the Earth so as to point the main axis of the star sensor towards the zenith and moves ($\Omega=7.292115 \times 10^{-5}$ rad/s) along with the Earth, and the angle variation of measured values of the star sensor corresponds to the movement of the star sensor. However, navigation stars stored in the navigation star catalog is expressed by coordinates in the J2000.0 Cartesian coordinate system (CRFJ2000), and due to the inconsistency of accuracies of three axes of the star sensor, a pointing precision of the star sensor is higher than a rolling precision thereof by one order of magnitude. In order to ensure the integrity of the pointing precision and high accuracy of the measurement, coordinates of the navigation star in the star sensor are converted into coordinates of the navigation stars in the terrestrial coordinate system (TRF) at the current measuring time, thus eliminating the influence of a roll axis of the Earth on the pointing precision. At this time, theoretically, output results of the star sensor are constant values, i.e., a mounting matrix of the star sensor coordinate system relative to the terrestrial coordinate system. The change in the main axis of the star sensor in the terrestrial coordinate system may be measured based on the mounting matrix, thus measuring the precision of a pointing axis of the star sensor.

The star sensor, the method for measuring the precision of the star sensor and the system using the same according to an embodiment of the present disclosure will be described in detail below with reference to the drawings.

Time may be inputted into the star sensor 1. Particularly, the star sensor 1 may comprise a memory 4. The memory is stored with a navigation star catalog comprising navigation stars, and the star sensor 1 is stored with visual movement parameters associated with the navigation stars.

The star sensor 1 may have star catalog conversion function, and time parameters may be input in the star sensor 1, thus facilitating the measurement for the precision of the star sensor 1 using the method and the system according to an embodiment of the present disclosure during the use of the star sensor 1. In order to carry out the present disclosure conveniently, the navigation star catalog may be provided based on the J2000.0 Cartesian coordinate system. The star sensor 1 may be configured to convert the navigation star catalog based on the J2000.0 Cartesian coordinate system into a navigation star catalog based on the terrestrial coordinate system.

According to an embodiment of the present disclosure, the navigation star catalog comprises visual movement parameters of navigation stars. During the manufacturing process, in consideration of the convenience of subsequent steps, the navigation star catalog may be stored in the memory 4 at one time.

Figure 5:
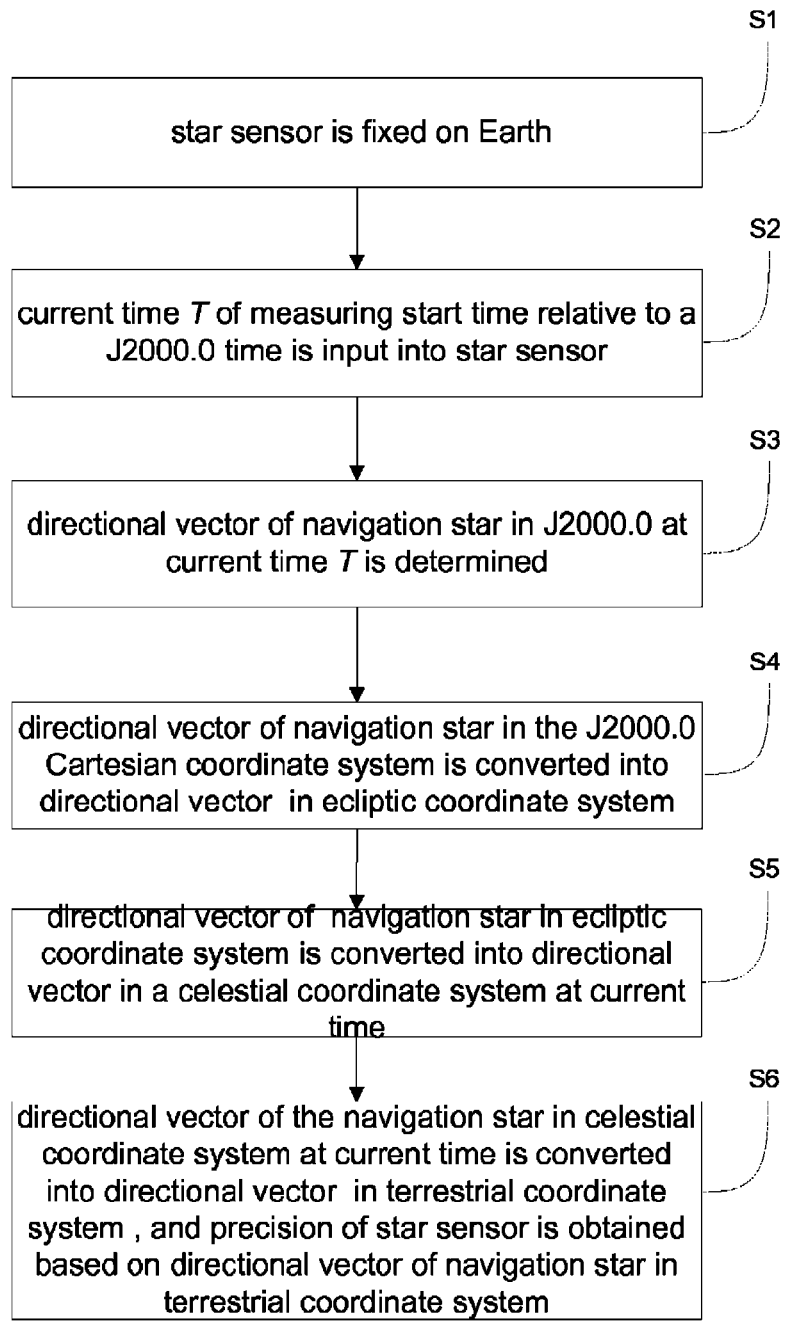
FIG. 5 is a flow chart of a method for measuring a precision of a star sensor according to an embodiment of the present disclosure.

The method for measuring the precision of the star sensor according to an embodiment of the present disclosure will be described below with reference to FIG. 5. As shown in FIG. 5, the method may comprise the following steps.

1) The star sensor 1 is fixed on the Earth so as to point a main axis of the star sensor 1 towards the zenith, and time parameters are input in the star sensor 1 which is stored with a navigation star catalog and visual movement parameters associated with the navigation star in the navigation star catalog (step S1). In the step S1, the star sensor 1 is fixed on the Earth to reduce the influence of the atmosphere and so on, and the main axis of the star sensor 1 is pointed towards the zenith so that the star sensor 1 may output corresponding attitude and image information along with the Earth movement.

2) A current time (T) of a measuring start time relative to a J2000.0 time is input into the star sensor 1 (step S2). The current time (T) may be a relative time of a current absolute time relative to the J2000.0 time. Certainly, it would be appreciated that the current time (T) may be obtained by converting the current absolute time.

3) A directional vector of the navigation star in a J2000.0 Cartesian coordinate system at the current time (T) is determined according to a right ascension and a declination ($\alpha$, $\delta$) of the navigation star in the J2000.0 Cartesian coordinate system and visual movement parameters ($\alpha'$, $\delta'$) of the navigation star in the direction of the right ascension and the declination which are stored in the star sensor 1 (step S3).

4) The directional vector of the navigation star in the J2000.0 Cartesian coordinate system at the current time (T) is converted into a directional vector of the navigation star in an ecliptic coordinate system (step S4).

5) The directional vector of the navigation star in the ecliptic coordinate system is converted into a directional vector ($v_{CRFT}$) of the navigation star in a celestial coordinate system at the current time (T) (step S5).

6) The directional vector ($v_{CRFT}$) of the navigation star in the celestial coordinate system at the current time (T) is converted into a directional vector ($v_{TRF}$) of the navigation star in a terrestrial coordinate system at an actual shooting time (T+$\Delta$t) according to the actual shooting time (T+$\Delta$t), and the precision of the star sensor 1 is obtained based on the directional vector ($v_{TRF}$) of the navigation star in the terrestrial coordinate system (step S6).

With the method for measuring the precision of the star sensor according to an embodiment of the present disclosure, by using the precise accuracy of the Earth rotation, the star sensor is fixed on the Earth so as to point the main axis of the star sensor towards the zenith and moves ($\Omega$=7.292115×10$^{-5}$ rad/s) along with the Earth, and the angle variation of measured values of the star sensor corresponds to the movement of the star sensor. However, navigation stars stored in the navigation star catalog is expressed by coordinates in the J2000.0 Cartesian coordinate system (CRFJ2000), and due to the inconsistency of accuracies of three axes of the star sensor, a pointing precision of the star sensor is higher than a rolling precision thereof by one order of magnitude. In order to ensure the integrity of the pointing precision and high accuracy of the measurement, coordinates of the navigation star in the star sensor are converted into coordinates of the navigation star in the terrestrial coordinate system (TRF) at the current measuring time, thus eliminating the influence of a roll axis of the Earth on the pointing precision. At this time, theoretically, output results of the star sensor are constant values, i.e., a mounting matrix of the star sensor coordinate system relative to the terrestrial coordinate system. The change in the main axis of the star sensor in the terrestrial coordinate system may be measured based on the mounting matrix, thus measuring the precision of a pointing axis of the star sensor.

The steps of the method for measuring the precision of the star sensor according to an embodiment of the present disclosure will be described in detail below.

In the step S3, the directional vector ($v_{CRFJ2000}$) of the navigation star in the J2000.0 Cartesian coordinate system at the current time (T) is as follows:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

In the step S4, the directional vector ($v_{ERF}$) of the navigation star in the ecliptic coordinate system is acquired by rotating the J2000.0 Cartesian coordinate system around an X axis of the J2000.0 Cartesian coordinate system counter-clockwise through 23°26'21" based on the directional vector ($v_{CRFJ2000}$) of the navigation star in the J2000.0 Cartesian coordinate system:

$$v_{ERF} = R_x(23°26'21")v_{CRFJ2000}.$$

According to an embodiment of the present disclosure, converting the directional vector ($v_{ERF}$) of the navigation star in the ecliptic coordinate system into the directional vector ($v_{CRFT}$) of the navigation star in the celestial coordinate system at the current time (T) is obtained by: rotating the directional vector ($v_{ERF}$) of the navigation star in the ecliptic coordinate system around a Z axis thereof clockwise through 50.29"×T to eliminate the influence of the equation of equinoxes; rotating the obtained vector of the navigation star around an X axis of a coordinate system after the first rotating clockwise through 23°26'21"; rotating the obtained vector of the navigation star around an X axis of a coordinate system after the second rotating counterclockwise through $\epsilon_A$; rotating the obtained vector of the navigation star around a Z axis of a coordinate system after the third rotating clockwise through $\Delta\phi$; and rotating the obtained vector of the navigation star around an X axis of a coordinate system after the fourth rotating clockwise through $\epsilon_A+\Delta\epsilon$, to obtain the directional vector ($v_{CRFT}$) of the navigation star in the celestial coordinate system at the current time (T) containing nutation terms, in which the $\Delta\phi$ and $\Delta\epsilon$ represent a nutation in longitude and an oblique nutation respectively.

Particularly, in the step S5, the directional vector ($v_{CRFT}$) of the navigation star in the celestial coordinate system is acquired by following formulas:

$$v_{CRFT} = R_x(-(\epsilon_A+\Delta\epsilon))R_Z(-\Delta\phi)R_X(\epsilon_A)$$

$$R_x(-23°26'21")R_Z(-50.29"\times T)R_X(23°26'21")$$
$$v_{CRFJ2000},$$

where $R_x$ and $R_z$ are coordination transformation bases when the ecliptic coordinate system rotates around an X axis and a Z thereof respectively, as described above.

According to an embodiment of the present disclosure, according to the IAU2000B nutation model, $\epsilon_A$; the nutation in longitude ($\Delta\phi$) and the oblique nutation ($\Delta\epsilon$) are obtained by following formulas respectively:

$$\varepsilon_A = \varepsilon_0 - 46.84024''t - 0.00059''t^2 + 0.001813''t^3$$

$$\Delta\varphi = \Delta\varphi_P + \sum_{i=1}^{77}[(A_{i1}+A_{i2}t)\sin\alpha_i + A_{i3}\cos\alpha_i]$$

$$\Delta\varepsilon = \Delta\varepsilon_P + \sum_{i=1}^{77}[(A_{i4}+A_{i5}t)\sin\alpha_i + A_{i6}\cos\alpha_i]$$

where $\Delta\phi_P=-0.135$ m("), $\Delta\epsilon_P=0.388$ m("), $\epsilon_0=84381.448"$, t is a Julian century number starting from J2000.0 and is obtained based on the current time (T), a summation notation represents a sum of 77 terms of sines and cosines, and each term is a sum of one sine and one cosine.

In addition, in the above formulas, an argument $\alpha_i$ is a linear combination of arguments which is determined as follows:

$$\alpha_i = \sum_{k=1}^{5} n_{ik}F_k$$
$$= n_{i1}l + n_{i2}l' + n_{i3}F + n_{i4}D + n_{i5}\Omega$$

where $n_{ik}$ is an integer, and $F_k$ is a Delaunay argument related to positions of the Sun and the Moon.

Particularly, in the above formulas:

$F=1=134.96340251°+1717915923.2178''t$ $F_2=l'=357.529109181°+129596581.0481''t$ $F_3=F=93.27209062°+1739527262.8478''t$ $F_4=D=297.85019547°+1602961601.2090''t$ $F_5=\Omega=125.04455501°-6962890.5431''t.$ Furthermore, the anterior 10 terms of $n_{ik}$ and $A_{i1}$-$A_{i6}$ in nutation expressions are listed in the following Tables 1-2. Other parameters may be found in the International Earth Rotation and Reference Systems Service website, i.e., http://www.iers.org.

Alternatively, coefficients in the nutation expressions may be found in "Celestial Reference System Transformation and its Application" (Press: Science Press; Author: Li Guangyu; ISBN: 9787030285102; Publication Date: August, 2010). The following Tables 1-2 schematically list the anterior 10 terms of finally desired coefficients.

TABLE 1

Coefficients of anterior 10 arguments of angle of amplitude in nutation expressions

| i | $n_{i1}$ | $n_{i2}$ | $n_{i3}$ | $n_{i4}$ | $n_{i5}$ |
|---|---|---|---|---|---|
| 1 | 0 | 0 | 0 | 0 | 1 |
| 2 | 0 | 0 | 2 | -2 | 2 |
| 3 | 0 | 0 | 2 | 0 | 2 |
| 4 | 0 | 0 | 0 | 0 | 2 |
| 5 | 0 | 1 | 0 | 0 | 0 |
| 6 | 0 | 1 | 2 | -2 | 2 |
| 7 | 1 | 0 | 0 | 0 | 0 |
| 8 | 0 | 0 | 2 | 0 | 1 |
| 9 | 1 | 0 | 2 | 0 | 2 |
| 10 | 0 | -1 | 2 | -2 | 2 |

TABLE 2

Coefficients of anterior 10 arguments in nutation expressions

| i | $A_{i1}$ | $A_{i2}$ | $A_{i3}$ | $A_{i4}$ | $A_{i5}$ | $A_{i6}$ |
|---|---|---|---|---|---|---|
| 1 | -17206.4161 | -17.4666 | 3.3386 | 9205.2331 | 0.9086 | 1.5377 |
| 2 | -1317.0906 | -0.1675 | -1.3696 | 573.0336 | -0.3015 | -0.4587 |
| 3 | -227.6413 | -0.0234 | 0.2796 | 97.8459 | -0.0485 | 0.1374 |
| 4 | 207.4554 | 0.0207 | -0.0698 | -89.7492 | 0.0470 | -0.0291 |
| 5 | 147.5877 | -0.3633 | 1.1817 | 7.3871 | -0.0184 | -0.1924 |
| 6 | -51.6821 | 0.1226 | -0.0524 | 22.4386 | -0.0677 | -0.0174 |
| 7 | 71.1159 | 0.0073 | -0.0872 | -0.6750 | 0.0000 | 0.0358 |
| 8 | -38.7298 | -0.0367 | 0.0380 | 20.0728 | 0.0018 | 0.0318 |
| 9 | -30.1461 | -0.0036 | 0.0816 | 12.9025 | -0.0063 | 0.0367 |
| 10 | 21.5829 | -0.0494 | 0.0111 | -9.5929 | 0.0299 | 0.0132 |

According to an embodiment of the present disclosure, the step S6 may further comprise:

(61) converting the directional vector ($v_{CRFT}$) of the navigation star in the celestial coordinate system at the current time (T) into the directional vector ($v_{TRF}$) of the navigation star in the terrestrial coordinate system at the actual shooting time (T+Δt) according to the actual shooting time (T+Δt);

(62) solving an optimal attitude matrix ($A_q$(T+Δt)) of the star sensor by the QUEST method according to the directional vector ($v_{TRF}$) of the navigation star in the terrestrial coordinate system;

(63) calculating a pointing vector (p(T+Δt)) of the main axis of the star sensor at the actual shooting time (T+Δt); and

(64) calculating an angle ($\alpha_{ij}$)) of the pointing vectors (p(T+Δt)) of the main axis of the star sensor at the actual shooting time (T+Δt) to obtain a pointing precision of the star sensor.

The directional vector ($v_{TRF}$) of the navigation star in the terrestrial coordinate system is obtained by rotating the directional vector ($v_{CRFT}$) of the navigation star in the celestial coordinate system around a Z axis of the celestial coordinate system counterclockwise at an angular velocity Ω of 7.292115×10⁻⁵ rad/s:

$v_{TRF} = R_Z(\Omega \Delta t) R_X(-(\epsilon_A + \Delta \epsilon)) R_Z(-\Delta \phi) R_X(\epsilon_A)$ $R_x(-23°26'21'') R_Z(-50.29'' \times T) R_X(23°26'21'')$
$v_{CRFJ2000}$.

According to an embodiment of the present disclosure, the optimal attitude matrix ($A_q$(T+Δt)) is obtained by minimizing a following objective function J($A_q$(T+Δt)):

$$J(A_q(T + \Delta t)) = \frac{1}{2} \sum_{i=1}^{n} \alpha_i \|w_i - A_q(T + \Delta t) v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma \alpha_i = 1$.

The pointing vector (p(T+Δt)) of the main axis of the star sensor is as follows:

$$p(T + \Delta t) = A_q(T + \Delta t) \begin{bmatrix} 0 \\ 0 \\ 1 \end{bmatrix}.$$

According to an embodiment of the present disclosure, the angle ($\alpha_{ij}$) of the pointing vectors (p(T+Δt)) of the main axis of the star sensor is as follows:

$\alpha_{ij} = a \cos(p(T+\Delta t_i)^T \cdot p(T+\Delta t_j))$, where i≠j.

The evaluation standard of the precision of the star sensor may be acquired by statistical analysis of $\alpha_{ij}$.

Figure 8:
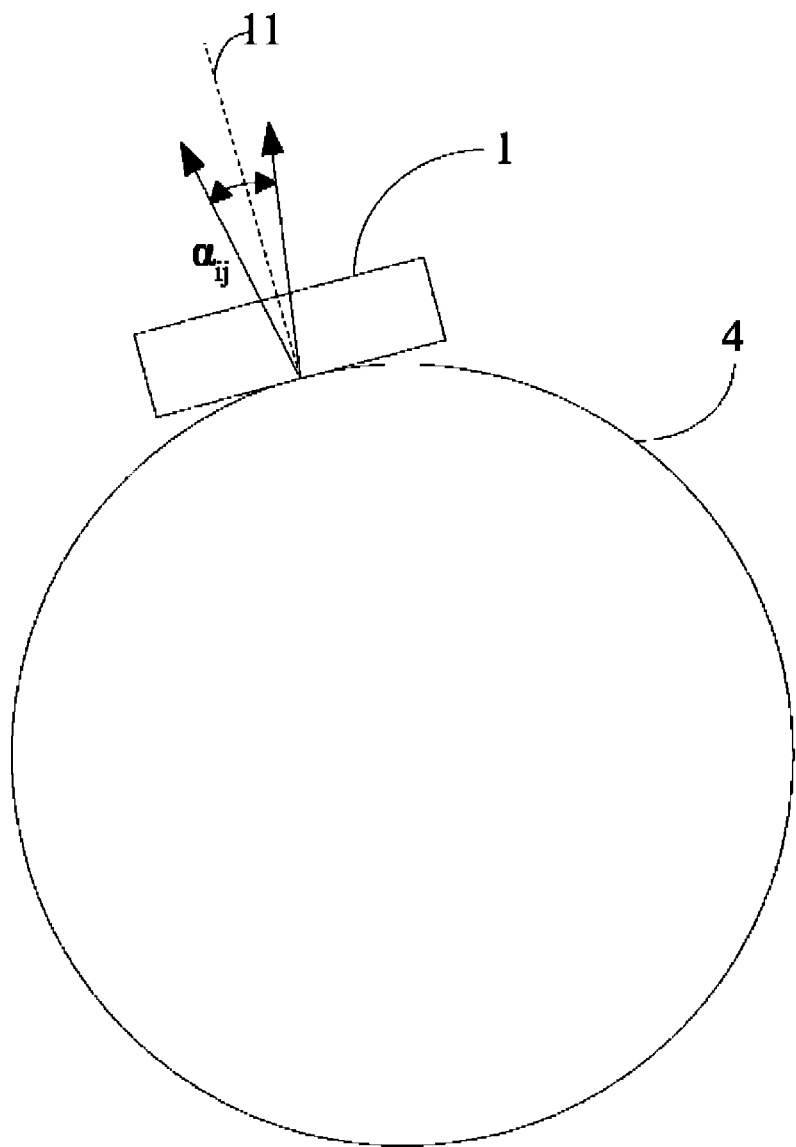
FIG. 8 is a schematic view of measuring a pointing precision of a star sensor according to an embodiment of the present disclosure.

In the abovementioned precision measuring method, the steps S1-S5 may only need to be performed once, but the step S6 may need to be performed at each time or in real time to collect and convert data continuously. Therefore, coordinate data of the navigation star in the terrestrial coordinate system at any time varied with the actual shooting time (T+Δt) may be obtained, and the precision of the star sensor may be acquired by statistical analysis of $\alpha_{ij}$ after solving the optimal attitude matrix ($A_q$(T+Δt)) of the star sensor, calculating the pointing vector (p(T+Δt)) of the main axis of the star sensor at the actual shooting time (T+Δt), and calculating the angle ($\alpha_{ij}$) of the pointing vectors (p(T+Δt)) of the main axis of the star sensor at the actual shooting time (T+Δt), as shown in FIG. 8. As shown in FIG. 8, change in an angle of a pointing axis 11 of the star sensor 1 may be generated when the star sensor 1 is used for measuring the Night sky along with the rotation of the Earth, and an angle between pointing vectors of the main axis of the star sensor 1 may be used for representing the pointing precision of the star sensor 1.

The system for measuring the precision of the star sensor according to an embodiment of the present disclosure will be described in detail below with reference to FIG. 6.

Figure 6:
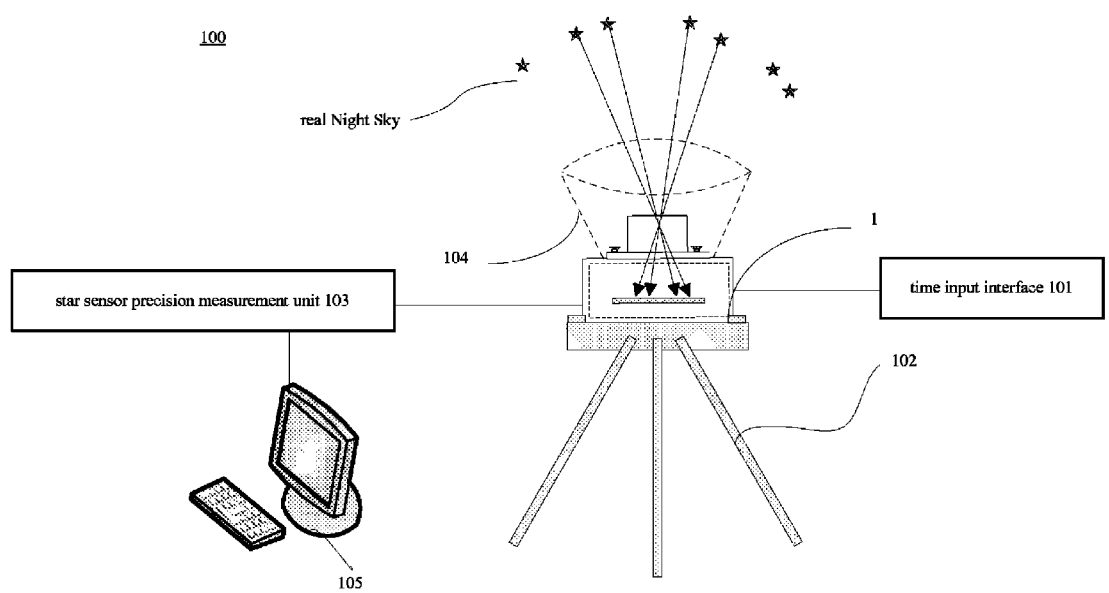
FIG. 6 is a schematic diagram of a system for measuring a precision of a star sensor according to an embodiment of the present disclosure.

As shown in FIG. 6, the system 100 for measuring the precision of the star sensor 1 according to an embodiment of the present disclosure may comprise the star sensor 1, a fixing device 102 and a star sensor precision measurement unit 103. The star sensor 1 may comprise a navigation star catalogue comprising a navigation star and visual movement parameters associated with the navigation star, and a time input interface 101 for inputting a measuring start time. The fixing device 102 is used for fixing the star sensor 1 on the Earth so as to point a main axis of the star sensor 1 towards the zenith. For example, the fixing device 102 may be a tripod. As described above, the star sensor 1 is fixed on the Earth to reduce the influence of the atmosphere and so on, and the main axis of the star sensor 1 is pointed towards the zenith so that the star sensor 1 may output corresponding attitude and image information along with the Earth movement. The precision testing of the star sensor 1 may be converted into the accurate comparison between measuring results of the star sensor 1 and the rotation of the Earth.

In the system for measuring the precision of the star sensor according to an embodiment of the present disclosure, the star sensor precision measurement unit 103 is used for measuring the precision of the star sensor 1, in which a current time (T) of the measuring start time relative to a J2000.0 time is input through the time input interface, a directional vector of the navigation star in a J2000.0 Cartesian coordinate system at the current time (T) is determined according to a right ascension and a declination (α, δ) of the navigation star in the J2000.0 Cartesian coordinate system and visual movement parameters (α', δ') of the navigation star in the direction of the right ascension and the declination which are stored in the star sensor 1, the directional vector of the navigation star in the J2000.0 Cartesian coordinate system at the current time (T) is converted into a directional vector of the navigation star in an ecliptic coordinate system, the directional vector of the navigation star in the ecliptic coordinate system is converted into a directional vector ($v_{CRFT}$) of the navigation star in a celestial coordinate system at the current time (T), the directional vector ($v_{CRFT}$) of the navigation star in the celestial coordinate system at the current time (T) is converted into a directional vector ($v_{TRF}$) of the navigation star in a terrestrial coordinate system at an actual shooting time (T+Δt) according to the actual shooting time (T+Δt), and the precision of the star sensor 1 is obtained based on the directional vector ($v_{TRF}$) of the navigation star in the terrestrial coordinate system.

With the system for measuring the precision of the star sensor according to an embodiment of the present disclosure, by using the precise accuracy of the Earth rotation, the star sensor is fixed on the Earth so as to point the main axis of the star sensor towards the zenith and moves (Ω=7.292115×10⁻⁵ rad/s) along with the Earth, and the angle variation of measured values of the star sensor corresponds to the movement of the star sensor. However, navigation stars stored in the navigation star catalog is expressed by coordinates in the J2000.0 Cartesian coordinate system (CRFJ2000), and due to the inconsistency of accuracies of three axes of the star sensor, a pointing precision of the star sensor is higher than a rolling precision thereof by one order of magnitude. In order to ensure the integrity of the pointing precision and high accuracy of the measurement, a coordinates of the navigation star in the star sensor are converted into a coordinate of the navigation star in the terrestrial coordinate system (TRF) at the current measuring time, thus eliminating the influence of a roll axis of the Earth on the pointing precision. At this time, theoretically, output results of the star sensor are constant values, i.e., a mounting matrix of the star sensor coordinate system relative to the terrestrial coordinate system. The change in the main axis of the star sensor in the terrestrial coordinate system may be measured based on the mounting matrix, thus measuring the precision of a pointing axis of the star sensor.

As shown in FIG. 6, the star sensor precision measurement unit 103 may further comprise: a lens mantle 104 fitted over the star sensor 1 for eliminating the interference of environmental stray light.

Figure 7:
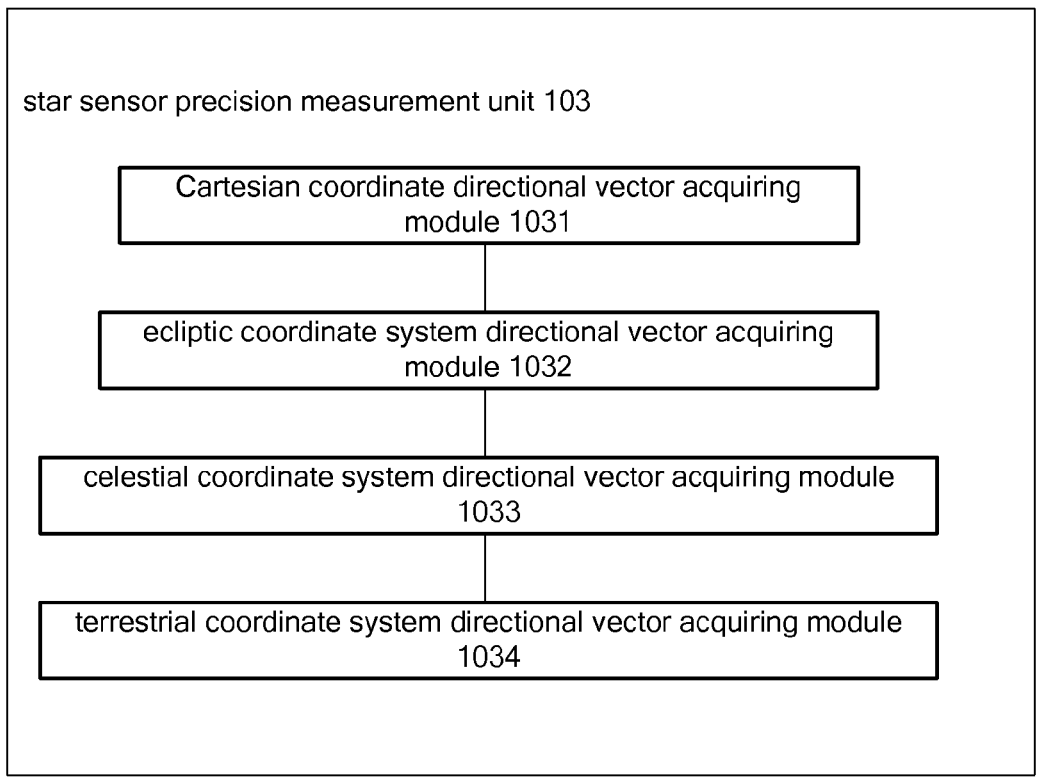
FIG. 7 is a block diagram of a star sensor precision measurement unit in a system for measuring a precision of a star sensor according to an embodiment of the present disclosure.

According to an embodiment of the present disclosure, as shown in FIG. 7, the star sensor precision measurement unit 103 may further comprise: a Cartesian coordinate directional vector acquiring module 1031 for acquiring the directional vector ($v_{CRFJ2000}$) of the navigation star in the J2000.0 Cartesian coordinate system at the current time (T) by the following formula:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

As shown in FIG. 7, the star sensor precision measurement unit 103 may further comprise: an ecliptic coordinate system directional vector acquiring module 1032 for acquiring the directional vector ($v_{ERF}$) of the navigation star in the ecliptic coordinate system by rotating the J2000.0 Cartesian coordinate system around an X axis of the J2000.0 Cartesian coordinate system counterclockwise by 23°26'21" based on the directional vector ($v_{CRFJ2000}$) of the navigation star in the J2000.0 Cartesian coordinate system:

$$v_{ERF} = R_x(23°26'21")v_{CRFJ2000}.$$

Furthermore, the star sensor precision measurement unit 103 may further comprise: a celestial coordinate system directional vector acquiring module 1033 for converting the directional vector ($v_{ERF}$) of the navigation star in the ecliptic coordinate system into the directional vector ($v_{CRFT}$) of the navigation star in the celestial coordinate system at the current time (T) by:

rotating the directional vector ($v_{ERF}$) of the navigation star in the ecliptic coordinate system around a Z axis thereof clockwise through 50.29"×T;

rotating the obtained vector of the navigation star around an X axis of a coordinate system after the first rotating clockwise through 23°26'21";

rotating the obtained vector of the navigation star around an X axis of a coordinate system after the second rotating counterclockwise through $\epsilon_A$;

rotating the obtained vector of the navigation star around a Z axis of a coordinate system after the third rotating clockwise through $\Delta\phi$; and rotating the obtained vector of the navigation star around an X axis of a coordinate system after the fourth rotating clockwise through $\epsilon_A+\Delta\epsilon$, to obtain the directional vector ($v_{CRFT}$) of the navigation star in the celestial coordinate system at the current time (T) containing nutation terms, in which $\Delta\phi$ and $\Delta\epsilon$ represent a nutation in longitude and an oblique nutation respectively.

Particularly, the celestial coordinate system directional vector acquiring module 1033 is configured to acquire the directional vector ($v_{CRFT}$) of the navigation star in the celestial coordinate system by following formulas:

$$v_{CRFT} = R_x(-(\epsilon_A+\Delta\epsilon))R_Z(-\Delta\phi)R_X(\epsilon_A)$$

$$R_x(-23°26'21")R_Z(-50.29"\times T)R_X(23°26'21")$$
$$v_{CRFJ2000},$$

where $R_x$ and $R_z$ are coordination transformation bases when the ecliptic coordinate system rotates around an X axis and a Z thereof respectively, as described above.

According to an embodiment of the present disclosure, according to the IAU2000B nutation model, $\epsilon_A$, the nutation in longitude ($\Delta\phi$) and the oblique nutation ($\Delta\epsilon$) are respectively as follows:

$$\varepsilon_A = \varepsilon_0 - 46.84024"t - 0.00059"t^2 + 0.001813"t^3$$

$$\Delta\varphi = \Delta\varphi_P + \sum_{i=1}^{77}[(A_{i1}+A_{i2}t)\sin\alpha_i + A_{i3}\cos\alpha_i]$$

$$\Delta\varepsilon = \Delta\varepsilon_P + \sum_{i=1}^{77}[(A_{i4}+A_{i5}t)\sin\alpha_i + A_{i6}\cos\alpha_i]$$

where $\Delta\phi_P$=−0.135 m("), $\Delta\epsilon_P$=0.388 m("), $\epsilon_0$=84381.448", t is a Julian century number starting from J2000.0 and is obtained based on the current time (T), a summation notation represents a sum of 77 terms of sines and cosines, and each term is a sum of one sine and one cosine.

In addition, in the above formulas, an argument $\alpha_i$ is a linear combination of arguments which is determined as follows:

$$\alpha_i = \sum_{k=1}^{5} n_{ik}F_k$$

$$= n_{i1}l + n_{i2}l' + n_{i3}F + n_{i4}D + n_{i5}\Omega$$

where $n_{ik}$ is an integer, and $F_k$ is a Delaunay argument related to positions of the Sun and the Moon.

The above parameters may refer to those described above in the method for measuring the precision of the star sensor according to an embodiment of the present disclosure, so detailed descriptions thereof will be omitted here for clarity purpose.

According to an embodiment of the present disclosure, the star sensor precision measurement unit 103 is configured to: convert the directional vector ($v_{CRFT}$) of the navigation star in the celestial coordinate system at the current time (T) into the directional vector ($v_{TRF}$) of the navigation star in the terrestrial coordinate system at the actual shooting time (T+$\Delta$t) according to the actual shooting time (T+$\Delta$t); solve an optimal attitude matrix ($A_q$(T+$\Delta$t)) of the star sensor by the QUEST method according to the directional vector ($v_{TRF}$) of the navigation star in the terrestrial coordinate system; calculate a pointing vector (p(T+$\Delta$t)) of the main axis of the star sensor at the actual shooting time (T+$\Delta$t); and calculate an angle ($\alpha_{ij}$) of the pointing vectors (p(T+$\Delta$t)) of the main axis of the star sensor at the actual shooting time (T+$\Delta$t) to obtain a pointing precision of the star sensor.

According to an embodiment of the present disclosure, the star sensor precision measurement unit 103 further comprises: a terrestrial coordinate system directional vector acquiring module 1034 for acquiring the directional vector ($v_{TRF}$) of the navigation star in the terrestrial coordinate system by rotating the directional vector ($v_{CRFT}$) of the navigation star in the celestial coordinate system around a Z axis of the celestial coordinate system counterclockwise at an angular velocity $\Omega$ of $7.292115 \times 10^{-5}$ rad/s:

$$v_{TRF} = R_Z(\Omega \Delta t) R_X(-(\epsilon_A + \Delta \epsilon)) R_Z(-\Delta \phi) R_X(\epsilon_A)$$

$$R_X(-23°26'21'') R_Z(-50.29'' \times T) R_X(23°26'21'') v_{CRFJ2000}.$$

According to an embodiment of the present disclosure, the optimal attitude matrix ($A_q(T+\Delta t)$) is obtained by minimizing a following objective function $J(A_q(T+\Delta t))$:

$$J(A_q(T+\Delta t)) = \frac{1}{2} \sum_{i=1}^{n} \alpha_i \|w_i - A_q(T+\Delta t)v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma \alpha_i = 1$.

According to an embodiment of the present disclosure, the pointing vector ($p(T+\Delta t)$) of the main axis of the star sensor 1 is as follows:

$$p(T+\Delta t) = A_q(T+\Delta t) \begin{bmatrix} 0 \\ 0 \\ 1 \end{bmatrix}.$$

According to an embodiment of the present disclosure, the angle ($\alpha_{ij}$) of the pointing vectors ($p(T+\Delta t)$) of the main axis of the star sensor is as follows:

$$\alpha_{ij} = a \cos(p(T+\Delta t_i)^T \cdot p(T+\Delta t_j)),$$

where $i \neq j$.

The evaluation standard of the precision of the star sensor may be acquired by statistical analysis of $\alpha_{ij}$.

The precision of the star sensor may be acquired by statistical analysis of $\alpha_{ij}$ after solving the optimal attitude matrix ($A_q T+\Delta t$) of the star sensor, calculating the pointing vector ($p(T+\Delta t)$) of the main axis of the star sensor at the actual shooting time ($T+\Delta t$), and calculating the angle ($\alpha_{ij}$) of the pointing vectors ($p(T+\Delta t)$) of the main axis of the star sensor at the actual shooting time ($T+\Delta t$).

The system 100 may further comprise a star sensor precision output unit 105 for outputting the pointing precision of the main axis of the star sensor measured by the star sensor precision measurement unit 103. As shown in FIG. 6, the system 100 may measure the real Night sky continuously during the operation, and the pointing precision of the main axis of the star sensor may be obtained using the star sensor precision measurement unit 103.

With the method for measuring the precision of the star sensor and the system using the same according to an embodiment of the present disclosure, by using the precise accuracy of the Earth rotation, the star sensor is fixed on the Earth so as to point the main axis of the star sensor towards the zenith. By using coordinate conversion and real-time detecting results, problems of complex operation, expensive precise rotary and expensive star simulator in the conventional method for measuring the precision of the star sensor and the system using the same may be solved, and compared with the conventional method for measuring the precision of the star sensor and the system using the same, the measuring results may be more accurate and real, the precision of the star sensor may meet the requirement, and the measuring process is easy to achieve.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "According to an embodiment of the present disclosure", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A method for measuring a precision of a star sensor, comprising steps of:
   1) fixing the star sensor on the Earth so as to point a main axis of the star sensor towards the zenith, the star sensor being inputable with time parameters which is stored with a navigation star catalog and visual movement parameters associated with a navigation star in the navigation star catalog;
   2) inputting a current time (T) of a measuring start time relative to a J2000.0 time;
   3) determining a directional vector of the navigation star in a J2000.0 Cartesian coordinate system at the current time (T) according to a right ascension and a declination ($\alpha$, $\delta$) of the navigation star in the J2000.0 Cartesian coordinate system and visual movement parameters ($\alpha'$, $\delta'$) of the navigation star in the direction of the right ascension and the declination which are stored in the star sensor;
   4) converting the directional vector of the navigation star in the J2000.0 Cartesian coordinate system at the current time (T) into a directional vector of the navigation star in an ecliptic coordinate system;
   5) converting the directional vector of the navigation star in the ecliptic coordinate system into a directional vector ($v_{CRFT}$) of the navigation star in a celestial coordinate system at the current time (T); and
   6) converting the directional vector ($v_{CRFT}$) of the navigation star in the celestial coordinate system at the current time (T) into a directional vector ($v_{TRF}$) of the navigation star in a terrestrial coordinate system at an actual shooting time ($T+\Delta t$) according to the actual shooting time ($T+\Delta t$), and obtaining the precision of the star sensor based on the directional vector ($v_{TRF}$) of the navigation star in the terrestrial coordinate system.

2. The method according to claim 1, wherein in the step 3), the directional vector ($v_{CRFJ2000}$) of the navigation star in the J2000.0 Cartesian coordinate system at the current time (T) is as follows:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

3. The method according to claim 2, wherein in the step 4), the directional vector ($v_{ERF}$) of the navigation star in the ecliptic coordinate system is acquired by rotating the J2000.0 Cartesian coordinate system around an X axis of the J2000.0 Cartesian coordinate system counterclockwise through 23°26'21" based on the directional vector ($v_{CRFJ2000}$) of the navigation star in the J2000.0 Cartesian coordinate system:

$$v_{ERF} = R_X(23°26'21'')v_{CRFJ2000}.$$

4. The method according to claim 3, wherein converting the directional vector ($v_{ERF}$) of the navigation star in the ecliptic coordinate system into the directional vector ($v_{CRFT}$) of the navigation star in the celestial coordinate system at the current time (T) is obtained by:
   rotating the directional vector ($v_{ERF}$) of the navigation star in the ecliptic coordinate system around a Z axis thereof clockwise through 50.29"×T;
   rotating the obtained vector of the navigation star around an X axis of a coordinate system after the first rotating clockwise through 23°26'21";
   rotating the obtained vector of the navigation star around an X axis of a coordinate system after the second rotating counterclockwise through $\epsilon_A$;
   rotating the obtained vector of the navigation star around a Z axis of a coordinate system after the third rotating clockwise through $\Delta\phi$; and
   rotating the obtained vector of the navigation star around an X axis of a coordinate system after the fourth rotating clockwise through $\epsilon_A + \Delta\epsilon$, to obtain the directional vector ($v_{CRFT}$) of the navigation star in the celestial coordinate system at the current time (T) containing nutation terms, wherein the $\Delta\phi$ and $\Delta\epsilon$ represent a nutation in longitude and an oblique nutation respectively.

5. The method according to claim 4, wherein the directional vector ($v_{CRFT}$) of the navigation star in the celestial coordinate system is acquired by following formulas:

$$v_{CRFT} = R_X(-(\epsilon_A + \Delta\epsilon))R_Z(-\Delta\phi)R_X(\epsilon_A)$$

$$R_X(-23\,°26'21'')R_Z(-50.29''\times T)R_X(23°26'21'')$$
$$v_{CRFJ2000},$$

where $R_X$ and $R_Z$ are coordination transformation bases.

6. The method according to claim 5, wherein according to the IAU2000B nutation model, $\epsilon_A$, the nutation in longitude ($\Delta\phi$) and the oblique nutation ($\Delta\epsilon$) are obtained by following formulas respectively:

$$\varepsilon_A = \varepsilon_0 - 46.84024''t - 0.00059''t^2 + 0.001813''t^3$$

$$\Delta\varphi = \Delta\varphi_P + \sum_{i=1}^{77}[(A_{i1} + A_{i2}t)\sin\alpha_i + A_{i3}\cos\alpha_i]$$

$$\Delta\varepsilon = \Delta\varepsilon_P + \sum_{i=1}^{77}[(A_{i4} + A_{i5}t)\sin\alpha_i + A_{i6}\cos\alpha_i]$$

where $\Delta\phi_P = -0.135$ m("), $\Delta\epsilon_P = 0.388$ m("), $\epsilon_0 = 84381.448''$, t is a Julian century number starting from J2000.0 and is obtained based on the current time (T); and an argument $\alpha_i$ is a linear combination of arguments which is determined as follows:

$$\alpha_i = \sum_{k=1}^{5} n_{ik}F_k$$
$$= n_{i1}l + n_{i2}l' + n_{i3}F + n_{i4}D + n_{i5}\Omega$$

where $n_{ik}$, is an integer, and $F_k$ is a Delaunay argument related to positions of the Sun and the Moon.

7. The method according to claim 1, wherein the step 6) further comprises:
   (61) converting the directional vector ($v_{CRFT}$) of the navigation star in the celestial coordinate system at the current time (T) into the directional vector ($v_{TRF}$) of the navigation star in the terrestrial coordinate system at the actual shooting time (T+$\Delta$t) according to the actual shooting time (T+$\Delta$t);
   (62) solving an optimal attitude matrix ($A_q$(T+$\Delta$t)) of the star sensor by the QUEST method according to the directional vector ($v_{TRF}$) of the navigation star in the terrestrial coordinate system;
   (63) calculating a pointing vector (p(T+$\Delta$t)) of the main axis of the star sensor at the actual shooting time (T+$\Delta$t); and
   (64) calculating an angle ($\alpha_{ij}$) of the pointing vectors (p(T+$\Delta$t)) of the main axis of the star sensor at the actual shooting time (T+$\Delta$t) to obtain a pointing precision of the star sensor.

8. The method according to claim 7, wherein the directional vector ($v_{TRF}$) of the navigation star in the terrestrial coordinate system is obtained by rotating the directional vector ($v_{CRFT}$) of the navigation star in the celestial coordinate system around a Z axis of the celestial coordinate system counterclockwise at an angular velocity $\Omega$ of $7.292115\times10^{-5}$ rad/s:

$$v_{TRF} = R_Z(\Omega\Delta t)R_X(-(\epsilon_A + \Delta\epsilon))R_Z(-\Delta\phi)R_X(\epsilon_A)$$

$$R_X(-23°26'21'')R_Z(-50.29''\times T)R_X(23°26'21'')$$
$$v_{CRFJ2000}.$$

9. The method according to claim 8, wherein the optimal attitude matrix ($A_q$(T+$\Delta$t)) is obtained by minimizing a following objective function $J(A_q(T+\Delta t))$:

$$J(A_q(T + \Delta t)) = \frac{1}{2}\sum_{i=1}^{n}\alpha_i\|w_i - A_q(T + \Delta t)v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma\alpha_i = 1$.

10. The method according to claim 9, wherein the pointing vector (p(T+$\Delta$t)) of the main axis of the star sensor is as follows:

$$p(T + \Delta t) = A_q(T + \Delta t)\begin{bmatrix} 0 \\ 0 \\ 1 \end{bmatrix},$$

and
   the angle ($\alpha_{ij}$) of the pointing vectors (p(T+$\Delta$t)) of the main axis of the star sensor is as follows:

$$\alpha_{ij} = a\cos(p(T+\Delta t_i)^T \cdot p(T+\Delta t_j)).$$

11. A system for measuring a precision of a star sensor, the star sensor comprising a navigation star catalogue comprising a navigation star and visual movement parameters associated with the navigation star, and a time input interface for inputting a measuring start time, the system comprising:
  a fixing device for fixing the star sensor on the Earth so as to point a main axis of the star sensor towards the zenith; and
  a star sensor precision measurement unit for measuring the precision of the star sensor, wherein a current time (T) of the measuring start time relative to a J2000.0 time is input through the time input interface, a directional vector of the navigation star in a J2000.0 Cartesian coordinate system at the current time (T) is determined according to a right ascension and a declination ($\alpha$, $\delta$) of the navigation star in the J2000.0 Cartesian coordinate system and visual movement parameters ($\alpha'$, $\delta'$) of the navigation star in the direction of the right ascension and the declination which are stored in the star sensor, the directional vector of the navigation star in the J2000.0 Cartesian coordinate system at the current time (T) is converted into a directional vector of the navigation star in an ecliptic coordinate system, the directional vector of the navigation star in the ecliptic coordinate system is converted into a directional vector ($v_{CRFT}$) of the navigation star in a celestial coordinate system at the current time (T), the directional vector ($v_{CRFT}$) of the navigation star in the celestial coordinate system at the current time (T) is converted into a directional vector ($v_{TRF}$) of the navigation star in a terrestrial coordinate system at an actual shooting time (T+$\Delta$t) according to the actual shooting time (T+$\Delta$t), and the precision of the star sensor is obtained based on the directional vector ($v_{TRF}$) of the navigation star in the terrestrial coordinate system.

12. The system according to claim 11, wherein the star sensor precision measurement unit further comprises:
  a Cartesian coordinate directional vector acquiring module for acquiring the directional vector ($v_{CRFJ2000}$) of the navigation star in the J2000.0 Cartesian coordinate system at the current time (T) by the following formula:

$$v_{CRFJ2000} = \begin{bmatrix} \cos(\alpha + \alpha'T)\cos(\delta + \delta'T) \\ \sin(\alpha + \alpha'T)\cos(\delta + \delta'T) \\ \sin(\delta + \delta'T) \end{bmatrix}.$$

13. The system according to claim 12, wherein the star sensor precision measurement unit further comprises:
  an ecliptic coordinate system directional vector acquiring module for acquiring the directional vector ($v_{ERF}$) of the navigation star in the ecliptic coordinate system by rotating the J2000.0 Cartesian coordinate system around an X axis of the J2000.0 Cartesian coordinate system counterclockwise through 23°26'21" based on the directional vector ($v_{CRFJ2000}$) of the navigation star in the J2000.0 Cartesian coordinate system:

$$v_{ERF} = R_X(23°26'21")v_{CRFJ2000}.$$

14. The system according to claim 13, wherein the star sensor precision measurement unit further comprises:
  a celestial coordinate system directional vector acquiring module for converting the directional vector ($v_{ERF}$) of the navigation star in the ecliptic coordinate system into the directional vector ($v_{CRFT}$) of the navigation star in the celestial coordinate system at the current time (T) by:
  rotating the directional vector ($v_{ERF}$) of the navigation star in the ecliptic coordinate system around a Z axis thereof clockwise through 50.29"×T;
  rotating the obtained vector of the navigation star around an X axis of a coordinate system after the first rotating clockwise through 23°26'21";
  rotating the obtained vector of the navigation star around an X axis of a coordinate system after the second rotating counterclockwise through $\epsilon_A$;
  rotating the obtained vector of the navigation star around a Z axis of a coordinate system after the third rotating clockwise through $\Delta\phi$; and
  rotating the obtained vector of the navigation star around an X axis of a coordinate system after the fourth rotating clockwise through $\epsilon_A+\Delta\epsilon$, to obtain the directional vector ($v_{CRFT}$) of the navigation star in the celestial coordinate system at the current time (T) containing nutation terms, wherein
  the $\Delta\phi$ and $\Delta\epsilon$ represent a nutation in longitude and an oblique nutation respectively.

15. The system according to claim 14, wherein the celestial coordinate system directional vector acquiring module is configured to acquire the directional vector ($v_{CRFT}$) of the navigation star in the celestial coordinate system by following formulas:

$$v_{CRFT}=R_X(-(\epsilon_A+\Delta\epsilon))R_Z(-\Delta\phi)R_X(\epsilon_A)$$

$$R_X(-23°26'21")R_Z(-50.29"\times T)R_X(23°26'21")$$
$$v_{CRFJ2000},$$

where $R_X$ and $R_Z$ are coordination transformation bases.

16. The system according to claim 15, wherein according to the IAU2000B nutation model, $\epsilon_A$, the nutation in longitude ($\Delta\phi$) and the oblique nutation ($\Delta\epsilon$) are respectively as follows:

$$\varepsilon_A = \varepsilon_0 - 46.84024"t - 0.00059"t^2 + 0.001813"t^3$$

$$\Delta\varphi = \Delta\varphi_P + \sum_{i=1}^{77}[(A_{i1} + A_{i2}t)\sin\alpha_i + A_{i3}\cos\alpha_i]$$

$$\Delta\varepsilon = \Delta\varepsilon_P + \sum_{i=1}^{77}[(A_{i4} + A_{i5}t)\sin\alpha_i + A_{i6}\cos\alpha_i]$$

where $\Delta\phi_P=-0.135$ m("), $\Delta\epsilon_P=0.388$ m("), $\epsilon_0=84381.448"$, t is a Julian century number starting from J2000.0 and is obtained based on the current time (T); and
an argument $\alpha_i$ is a linear combination of arguments which is determined as follows:

$$\alpha_i = \sum_{k=1}^{5} n_{ik}F_k$$
$$= n_{i1}l + n_{i2}l' + n_{i3}F + n_{i4}D + n_{i5}\Omega$$

where $n_{ik}$ is an integer, and $F_k$ is a Delaunay argument related to positions of the Sun and the Moon.

17. The system according to claim 16, wherein the star sensor precision measurement unit is configured to:
  convert the directional vector ($v_{CRFT}$) of the navigation star in the celestial coordinate system at the current time (T) into the directional vector ($v_{TRF}$) of the navigation star in the terrestrial coordinate system at the actual shooting time (T+Δt) according to the actual shooting time (T+Δt);

solve an optimal attitude matrix ($A_q(T+\Delta t)$) of the star sensor by the QUEST method according to the directional vector ($v_{TRF}$) of the navigation star in the terrestrial coordinate system;

calculate a pointing vector (p(T+Δt)) of the main axis of the star sensor at the actual shooting time (T+Δt), and calculate an angle ($\alpha_{ij}$) of the pointing vectors (p(T+Δt)) of the main axis of the star sensor at the actual shooting time (T+Δt) to obtain a pointing precision of the star sensor.

18. The system according to claim 17, wherein the star sensor precision measurement unit further comprises:

a terrestrial coordinate system directional vector acquiring module for acquiring the directional vector ($v_{TRF}$) of the navigation star in the terrestrial coordinate system by rotating the directional vector ($V_{CRFT}$) of the navigation star in the celestial coordinate system around a Z axis of the celestial coordinate system counterclockwise at an angular velocity Ω of $7.292115 \times 10^{-5}$ rad/s:

$v_{TRF} = R_Z(\Omega \Delta t)(-(\epsilon A+\Delta\epsilon))R_Z(-\Delta\phi)R_X(\epsilon_A)$ $R_X(-23°26'21'')R_Z(-50.29''\times T)R_X(23°26'21'')$
$v_{CRF,J2000}$.

19. The system according to claim 18, wherein the optimal attitude matrix ($A_q(T+\Delta t)$) is obtained by minimizing a following objective function $$J(A_q(T+\Delta t)) = \frac{1}{2}\sum_{i=1}^{n}\alpha_i\|w_i - A_q(T+\Delta t)v_i\|^2$$

where $w_i$, $v_i$ represent a directional vector of the navigation star in a star sensor coordinate system and a directional vector of the navigation star in the terrestrial coordinate system respectively, $\alpha_i$ represents a weighing coefficient, and $\Sigma\alpha_i=1$.

20. The system according to claim 19, wherein the pointing vector (p(T+Δt)) of the main axis of the star sensor is as follows:

$$p(T+\Delta t) = A_q(T+\Delta t)\begin{bmatrix}0\\0\\1\end{bmatrix},$$

and the angle ($\alpha_{ij}$) of the pointing vectors (p(T+Δt)) of the main axis of the star sensor is as follows:

$\alpha_{ij} = a\cos(p(T+\Delta t_i)^T \cdot p(T+\Delta t_j))$, where i≠j.

* * * * *